United States Patent Office 2,985,676
Patented May 23, 1961

2,985,676

COBALTITHIOPROPIONATES

Henri Albert Dumesnil, 10 Rue du Platre, Paris, France, assignor to Frank E. Jonas, New York, N.Y.

No Drawing. Original application Dec. 7, 1955, Ser. No. 551,520. Divided and this application June 27, 1958, Ser. No. 744,922

7 Claims. (Cl. 260—439)

The present invention relates to new organic cobalt compounds and more particularly to cobaltithiopropionates and their production. The present application is a division of my copending application Serial No. 551,520, filed December 7, 1955, the contents of which are hereby made a part hereof.

Cobaltithiopropionates according to the invention have the following general formula:

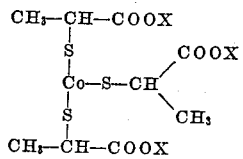

wherein X is a salt or ester group such as a monovalent metal, a group $Me_n$, in which Me is a polyvalent metal and $n$ is a fractional number whose numerator is 1 and whose denominator is equal to the valence of the polyvalent metal, an alcoholic group such as an alkyl group, or the cation of an organic base. The X groups in the above formula may be the same or different within the definition of X above set forth. The group X can particularly be sodium, potassium, calcium, methyl or ethyl.

The above cobaltithiopropionates are prepared by reacting in aqueous medium a suitable inorganic cobalt compound, such as cobalt carbonate, cobalt oxide or cobalt hydroxide, with the thiolpropionic acid or a thiolpropionate of the formula:

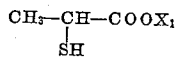

wherein $X_1$ is hydrogen or any of the X groups hereinbefore stated.

The choice of cobalt compound is dictated by the care of not introducing into the reaction medium any acid residue which can cause retrogression of the reaction. The reaction can be carried out at any ambient temperature whatsoever but it has been found to be advantageous to heat the reaction somewhat, preferably to the reflux temperature of the solvent in order to accelerate the reaction. The alkali salts of the cobaltithiopropionates are soluble in water but the other cobaltithiopropionates are insoluble in water and can thus be readily separated from the reaction mixture. In order to separate the alkali cobaltithiopropionates, there is added to the water serving as reaction medium an organic solvent, such as alcohol or acetone, in which they are insoluble.

The new cobaltithiopropionates are crystalline compounds without definite melting point, easily decomposable by strong acids, oxidizing agents and strong reducing agents and in which the cobalt in the form of a complex can be detected only after destruction of the molecule. Sodium and calcium cobaltithiopropionates crystallize with 5 and 10 molecules of water, respectively. The alkali (potassium and sodium) cobaltithiopropionates are soluble in water; the other derivatives of the above general formula are insoluble in water. The metal salts are insoluble in concentrated alcohol whereas the organic salts are soluble therein.

The thiolpropionates used for reaction with the inorganic cobalt compound can be readily obtained from thiolpropionic acid by the action therewith of a suitable compound capable of transferring the radical X. In general, the mineral salts and the alkali and alkaline-earth metal salts of thiolpropionic acid are directly obtained by neutralization of the acid by means of bases of the metals. Heavy metal salts are obtained by the action of thiolpropionic acid on the appropriate metal carbonates, the reactions taking place according to the theoretical equations. To prepare the salts of amines, amino alcohols and the ether salts of thiolpropionic acid, potassium thiolpropionate is caused to react in strong alcoholic medium, such as 99% methanol, on halides of the radical X to be substituted.

The preparation of the new cobaltithiopropionates will be understood from my aforesaid copending application and from the following non-limitative examples.

EXAMPLE 1

*Potassium cobaltithiopropionate*

106 grams of thiolpropionic acid dissolved in its own weight of distilled water is neutralized with 20% KOH. The resulting solution is added to an equal volume of 96% ethanol and raised to boiling while adding 20 grams of pure cobalt carbonate, the boiling being continued until complete evolution of $CO_2$ has occurred. This is allowed to cool and the solution is then filtered and the insoluble fraction washed with alcohol and then with ether and dried.

EXAMPLE 2

*Sodium cobaltithiopropionate*

The procedure of Example 1 is followed except that the KOH is replaced by NaOH. The product obtained crystallizes with 5 molecules of water.

EXAMPLE 3

*Ethyl cobaltithiopropionate*

100 grams of ethylthiolpropionate, obtained according to Example 3 of my said copending application, is dissolved in 250 cm.$^3$ of 96% ethanol and is then raised to a temperature of about 75° C., while adding slowly 150 grams of hydrated cobalt carbonate. After reaction, the precipitate is removed by filtration, washed with a little alcohol and then with ether to eliminate the last traces of unconverted ethylthiolpropionate.

EXAMPLE 4

*Diethylamine cobaltithiopropionate*

106 grams of thiolpropionic acid, dissolved in an equal weight of water, are neutralized with 73 grams of pure diethylamine, brought to a boil and 20 grams of cobalt carbonate added with agitation. After reaction, the mixture is allowed to cool and treated according to Example 1.

The new compounds of the invention have various uses. The water soluble compounds in aqueous solution adhere strongly to vegetable fibers. After impregnation of the fibers and treatment with a solution of calcium chloride, alcohol or any other agent capable of effecting precipitation and insolubilization of the initially soluble salt, there is obtained a solid dye varying in color from red to brown. Moreover, when X is a non-toxic group or radical, the new compounds have interesting therapeutic properties for the treatment of anemias, particularly primary anemias, in animals and humans. These compounds have anti-anemic action in very small doses, the calcium compound being best. They also exert a vasodilatatory action which is particularly apparent in the small circulation and at the level of the capillaries. The compounds are especially useful in the synergistic compositions set forth in my said copending application by combining 4.5 milligrams of sodium cobaltithiopropionate with 100 milligrams of sodium thiolpropionate and 50 milligrams of the stated benzimidazole nicotinate derivative in 5 milliliters of water.

The invention is defined by the appended claims.

What is claimed is:

1. A cobaltithiopropionate of the formula:

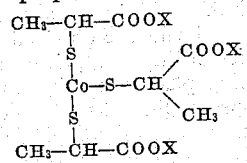

wherein each X is selected from the group consisting of sodium, potassium, calcium, methyl, ethyl, and diethylamine.

2. A cobaltithiopropionate according to claim 1, in which X is sodium.
3. A cobaltithiopropionate according to claim 1, in which X is potassium.
4. A cobaltithiopropionate according to claim 1, in which X is calcium.
5. A cobaltithiopropionate according to claim 1, in which X is methyl.
6. A cobaltithiopropionate according to claim 1, in which X is ethyl.
7. A cobaltithiopropionate according to claim 1, in which X is diethylamine.

References Cited in the file of this patent

UNITED STATES PATENTS

| | | |
|---|---|---|
| 1,683,104 | Schoeller et al. | Sept. 4, 1928 |
| 2,509,198 | Moore | May 30, 1950 |

OTHER REFERENCES

Heilbron: Dictionary of Organic Compounds, vol. IV, page 497 (1953).